United States Patent
Takamura et al.

(10) Patent No.: US 6,348,525 B1
(45) Date of Patent: Feb. 19, 2002

(54) CO-AGGLOMERATION OF RANDOM VINYL SUBSTITUTED AROMATIC/CONJUGATED DIOLEFIN POLYMER WITH SULFUR TO IMPROVE HOMOGENEITY OF POLYMER/ASPHALT ADMIXTURES

(75) Inventors: Koichi Takamura; Paul Velasco; Peter Blanpain, all of Charlotte, NC (US); John Cheng, Allentown, PA (US); Heinz Plaumann, Schwarzheide (DE); Richard W. Liu, Houston, TX (US); Wayne Millican; Barry Baughman, both of Charlotte, NC (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/611,411

(22) Filed: Jul. 6, 2000

(Under 37 CFR 1.47)

Related U.S. Application Data

(63) Continuation of application No. 09/181,161, filed on Oct. 28, 1998, now Pat. No. 6,127,461, which is a continuation-in-part of application No. 09/653,553, filed on Apr. 21, 1998, now Pat. No. 6,024,476.

(51) Int. Cl.$^7$ ............................................. C08L 95/00
(52) U.S. Cl. ..................... 524/60; 264/117; 523/335; 524/59; 524/60; 524/71
(58) Field of Search ............................... 524/60, 71, 61; 523/335; 264/117

(56) References Cited

U.S. PATENT DOCUMENTS

| | | | |
|---|---|---|---|
| 3,634,293 A | 1/1972 | Bonitz | 524/59 |
| 3,803,066 A | 4/1974 | Petrossi | 524/60 |
| 3,992,340 A | 11/1976 | Bonitz | 524/59 |
| 4,130,516 A | 12/1978 | Gagle et al. | 524/71 |
| 4,145,322 A | 3/1979 | Maldonado et al. | 524/68 |
| 4,242,246 A | 12/1980 | Maldonado et al. | 524/71 |
| 4,412,019 A | 10/1983 | Kraus | 524/71 |
| 4,554,313 A | 11/1985 | Hagenbach et al. | 525/54.5 |
| 4,576,648 A | 3/1986 | Demangeon et al. | 106/269 |
| 5,314,935 A | 5/1994 | Chaverot et al. | 524/64 |
| 5,371,121 A | 12/1994 | Bellomy et al. | 524/68 |
| 5,374,672 A | 12/1994 | Chaverot et al. | 524/60 |
| 5,382,612 A | 1/1995 | Chaverot et al. | 524/60 |
| 5,618,862 A | 4/1997 | Germanaud et al. | 524/68 |
| 5,672,642 A | 9/1997 | Gros | 524/68 |
| 6,127,461 A * | 10/2000 | Takamura et al. | 524/60 |

FOREIGN PATENT DOCUMENTS

| | | | |
|---|---|---|---|
| EP | 0 020 203 A1 | 12/1980 | C08J/3/20 |
| FR | 2 533 935 A1 | 6/1984 | C08L/95/00 |

OTHER PUBLICATIONS

Madge, E., W., Latex Foam Rubber, MacLaren & Sons Ltd., London, 1962.

The Vanderbilt Rubber Handbook, Thirteenth Edition, R. T. Vanderbilt Company, Inc. 1990.

* cited by examiner

*Primary Examiner*—Peter Szekely

(57) ABSTRACT

The present invention relates to the coagglomeration of random vinyl substituted aromatic/$C_4$–$C_6$ conjugated diolefin polymers With sulfur. Said coagglomerate is storage stable and easily blended with asphalt under a variety of mixing conditions. Further, polymer/asphalt blends prepared with the sulfur coagglomerated polymers show improved storage stability against phase separation.

4 Claims, No Drawings

CO-AGGLOMERATION OF RANDOM VINYL SUBSTITUTED AROMATIC/CONJUGATED DIOLEFIN POLYMER WITH SULFUR TO IMPROVE HOMOGENEITY OF POLYMER/ ASPHALT ADMIXTURES

This application is a continuation of application Ser. No. 09/181,161, filed Oct. 28, 1998 now U.S. Pat. No. 6,127,461, which is a continuation-in-part application of Ser. No. 09/063,553 filed Apr. 21, 1998, now U.S. Pat. No. 6,024,476.

FIELD OF THE INVENTION

The present invention relates to the coagglomeration of random vinyl substituted aromatic/$C_4$–$C_6$ conjugated diolefin polymers with sulfur. Said coagglomerate is storage stable and easily blended with asphalt under a variety of mixing conditions. Further, polymer/asphalt blends prepared with the sulfur coagglomerated polymers show improved storage stability against phase separation.

BACKGROUND

Sulfur vulcanization of Styrene|Butadiene/Styrene block copolymers and Styrene/Butadiene Rubber (SBR) to improve the mechanical properties of polymer/asphalt admixtures is known to those skilled in the art. Specifically, U.S. Pat. No. 3,803,066 discloses a modified bitumen prepared by blending a powder or latex of rubber (natural or synthetic) into the bitumen at 125–160° and adding sulfur and a vulcanization accelerator (e.g. organic peroxide) to this mixture in a ratio of sulfur to rubber of 0.3 to 0.9. Said modified bitumen is homogeneous and ductile at low temperatures. U.S. Pat. No. 3,634,293 discloses compositions containing bitumen, olefin polymers (e.g ethylene acrylate), a base (e.g. metal salt of an oxide, hydroxide, sulfide, carbonate or silicate) and sulfur. The order of addition can be bitumen plus polymer followed by sulfur addition or all together. Said composition is said to be homogeneous and elastic. U.S. Pat. No. 3,992,340 discloses vulcanized molding compositions comprising bitumen and olefin polymers and sulfur. These molding compounds have a 2:1 to 1:1 weight ratio of bitumen to olefin polymer. Various orders of addition of ingredients were disclosed including (i) bitumen plus sulfur and a vulcanization accelerator, these are then added to the olefin (e.g. styrene/butadiene) polymer (ii) bitumen olefin polymer and sulfur mixed all together, and cured by the vulcanization accelerator addition, (iii) mixing bitumen, olefin polymer, sulfur, a vulcanization accelerator all together and (iv) prepare a homogeneous mixture of an olefin polymer, sulfur and a vulcanization accelerator, followed by mixing the homogeneous mixture with bitumen.

U.S. Pat. No. 4,130,516 discloses the addition of 3–7% sulfur into asphalt to increase ductility. A small amount (0.5–1.5%) of SOLPRENE® 1206 (a linear random styrene/butadiene copolymer) is added to further increase ductility.

U.S. Pat. No. 4,412,019 discloses the use of a hydrogenated styrene|butadiene rubber (e.g Solprene 512—a substantially linear butadiene/styrene block copolymer coupled with epoxidized soy bean oil) with sulfur for improving the temperature stability of asphalt. The hydrogenated styrene/butadiene rubber is used at a level of 5–20% and the sulfur is used at a level of 1–40% sulfur in the asphalt. The polymer has a molecular weight of 70,000.

U.S. Pat. Nos. 4,145,322, 5,314,935, 5,371,121, all disclose bitumen/polymer compositions wherein bitumen and di or tri block copolymers are blended together, and then the sulfur, or sulfur plus vulcanization accelerator, is added to the bitumen/polymer blend.

U.S. Pat. No. 4,242,246 discloses a process for the preparation of bituminous compositions making use of a mother solution containing styrene/butadiene block co-polymers and sulfur in a petroleum solvent. The polymers are block copolymers of styrene and butadiene of molecular weight 30,000 to 300,000, preferably between 70,000 and 200,000. Said styrene/butadiene block co-polymer is premixed with sulfur (2 to 6% by weight to the polymer) into a petrolerm solvent. The styrene/butadiene block polymer|sulfur/solvent mixture is blended into the asphalt.

U.S. Pat. No. 4,554,313 discloses a process for preparing bitumen-polymer compositions comprising the use of organic sulfur compounds, such as ditertiododecyl or dinonyl pentasulphide. The polymers are random or block copolymers of styrene and butadiene of molecular weight 30,000 to 300,000, preferably between 70,000 and 200,000. The sulfur compound and co-polymer are dissolved into a hydrocarbon oil, and then added to the asphalt.

U.S. Pat. No. 4,576,648 discloses cationic emulsions of bituminous binders of the bitumen type comprising cationic asphalt emulsions prepared using the polymer modified asphalt disclosed in U.S. Pat. No. 4,554,313.

U.S. Pat. No. 5,672,642 discloses a process for preparing storage stable asphalt/polymer blends prepared by contacting elemental sulfur with asphalt to form a blend. Said elemental sulfur/asphalt blend is added to the polymer. The preferred polymers are diene block copolymers such as styrene/butadiene/styrene and styrene/isoprene/styrene.

Additionally, styrene|butadiene rubber latex containing sulfur and/or a vulcanization accelerator is commercially available as BUTONAL® NX 1106x and ULTRAPAVE® 5061. The sulfur and vulcanization accelerator were simply added to the latex.

Applicants have discovered that an aqueous sulfur dispersion, with or without a vulcanization accelerator, can be co-agglomerated with the SBR base latex for the preparation of the high solids sulfur co-agglomerated SBR latex. Surprisingly, the sulfur co-agglomerated SBR latex is easier to mix with the asphalt and either reduces or totally eliminates separation of the polymer rich layer during storage at elevated temperature (e.g. 160° C. to 180° C. for 2 to 3 days). Further, if separation occurs, it is easily re-mixed with gentle agitation. Thus, the polymer-asphalt admixture prepared with the sulfur co-agglomerated SBR latex maintains homogeneity. Further, Applicants' method requires no petroleum solvents and less sulfur is required.

Finally, since the SBR latex polymer/sulfur agglomerate is storage stable, it is easily blended with the asphalt on the job site, alleviating the compatibility problems associated with polymer modified asphalts.

DEFINITIONS AND USAGES OF TERMS

The term "random copolymer", as used herein, means a polymer in which the monomeric units comprising said polymer are randomly arranged.

The term "block copolymer", as used herein, means a polymer in which the monomeric units comprising said polymer are arranged in blocks, e.g [styrene-butadiene-styrene]-[styrene-butadiene-styrene].

The term, "agglomeration" and "co-agglomeration," as used herein, means processes producing a latex having a broad particle size distribution, which is essential to achieve a low enough viscosity at this high total solids. Detailed descriptions of the various agglomeration processes can be found in E. W. Madge, "Latex Foam Rubber, Chapter 14, Methods of Manufacture of General Purpose Synthetic Latex For Foam Rubber Production", Maclaren & Sons Ltd., London, 1962.

The term "latex form", as used herein, means stable polymer emulsions.

The term "mPas," as used herein, means milli Pascal second. It is used to express viscosity.

The terms "asphalt" and "bitumen", as used herein, can be used interchangably.

All weights are weight % unless otherwise indicated.

SUMMARY

The present invention relates to a process for preparing random vinyl substituted aromatic/$C_4$–$C_6$ conjugated diolefin latex polymer/sulfur coagglomerates comprising the steps of:

(a) blending said random vinyl substituted aromatic/$C_4$–$C_6$ conjugated diolefin latex polymer and an aqueous dispersion of sulfur;

(b) agglomerating the blended random vinyl substituted aromatic/$C_4$–$C_6$ conjugated diolefin latex polymer and sulfur formed in step (a) to form a coagglomerate in latex form.

The present invention also relates to a method for improving the homogeneity of random vinyl substituted aromatic/$C_4$–$C_6$ conjugated diolefin latex polymer/asphalt admixtures:

(a) blending said random vinyl substituted aromatic/$C_4$–$C_6$ conjugated diolefin latex polymer and an aqueous dispersion of sulfur.

(b) agglomerating the blended random vinyl substituted aromatic/$C_4$–$C_6$ conjugated diolefin latex polymer and sulfur formed in step (a) to form a coagglomerate in latex form.

(c) Mixing of said coagglomerate formed in step (b) with the asphalt at temperature between 100° C. and 160° C.

Further, the vinyl substituted aromatic, e.g. the styrene, component of the latex polymer may be reduced or omitted. Thus, the $C_4$–$C_6$ conjugated diolefin homopolymer, polybutadiene for example, may be co-agglomerated with the sulfur without the vinyl substituted aromatic (e.g. styrene) polymer. The vinyl substituted aromatic (e.g.styrene) component of the latex polymer which is blended with the sulfur dispersion to form a co-agglomerate can be at a level of 0–35%.

DETAILED DESCRIPTION

The present invention relates to a process for preparing random vinyl substituted aromatic/$C_4$–$C_6$ conjugated diolefin latex polymer/sulfur coagglomerates comprising the steps of.

(a) blending said random vinyl substituted aromatic/$C_4$–$C_6$ conjugated diolefin latex polymer and an aqueous dispersion of sulfur;

(b) agglomerating the blended random vinyl substituted aromatic/$C_4$–C6 conjugated diolefin latex polymer and sulfur formed in step (a) to form a coagglomerate in latex form.

The present invention also relates to a method for improving the homogeneity of random vinyl substituted aromatic/$C_4$–$C_6$ conjugated diolefin latex polymer/asphalt admixtures of:

(a) blending said random vinyl substituted aromatic/$C_4$–$C_6$ conjugated diolefin latex polymer and an aqueous dispersion of sulfur;

(b) agglomerating the blended random vinyl substituted aromatic/$C_4$–$C_6$ conjugated diolefin latex polymer and sulfur formed in step (a) to form a coagglomerate in latex form.

(c) Mixing of said coagglomerate formed in step (b) with the asphalt at temperature between 100° C. and 160° C.

Further, the random vinyl substituted aromatic, e.g. the styrene, component of the latex polymer may be reduced or omitted. Thus, the $C_4$–$C_6$ conjugated diolefin homopolymer, polybutadiene for example, may be co-agglomerated with the sulfur without the vinyl substituted aromatic (e.g. styrene) polymer. The vinyl substituted aromatic (e.g.styrene) component of the latex polymer which is blended with the sulfur dispersion to form a co-agglomerate can be at a level of 0–35%.

The latex polymer-sulfur coagglomerate prepared in step (b) is easy to mix with the asphalt, and either reduces or eliminates formation of the polymer rich layer on the asphalt-polymer admixture surface during storage at elevated temperature 160° C. to 180° C.) for a prolonged period (2 to 3 days).

Further, the polymer rich layer, if formed, is easily re-mixed in with gentle agitation, thus, the polymer-asphalt admixture prepared in step (c) with the latex-sulfur coagglomerate maintains homogeneous mixture with or without a low shear mixing during storage.

The Practice of the Present Invention

The coagglomeration of the sulfur dispersion and the random vinyl substituted aromatic/$C_4$–$C_6$ conjugated diolefin latex polymer is key to the invention. Without intending to be limited, the coagglomeration can be carried out in a variety of ways.

The sulfur dispersion is blended with the random vinyl substituted aromatic/$C_4$–$C_6$ conjugated diolefin polymer at levels 0.5 to 10%, more preferably 1–6%, most preferably 2–3%. After blending with the random vinyl substituted aromatic/$C_4$–$C_6$ conjugated diolefin polymer the coagglomeration process begins.

Several coagglomeration processes, such as freeze, pressure and chemical coagglomeration processes have been commercially utilized. Detailed description of these coagglomeration processes as well as the production of the SBR latex can be found in E. W. Madge, "Latex Foam Rubber, Chapter 14, Methods of Manufacture of General Purpose Synthetic Latex For Foam Rubber Production", Maclaren & Sons Ltd., London, 1962. Basically, high solids SBR latex is produced by the coagglomeration process followed by water removal to produce the latex dispersion of 68–72% total solids. The agglomeration process produces a latex dispersion having very broad particle size distribution of below 100 nm to above a few micrometers in diameter.

The coagglomerate is in the anionic form. Said coagglomerate can be converted to the cationic form by the addition of cationic surfactants, including, but not limited to, Redicote® E-5, Redicoate® E-11, Redicote® E-53, Redicote® E-606, Redicote® 5127 (proprietary cationic amines) available from Akzo Nobel. Adogen® 477HG (tallow pentamethyl propane diammonium-chloride, from Witco), Indulin® W-1, Indulin® W-5, Indulin® SBT, Indulin® MQK (from Westvaco) are also suitable cationic surfactants. Other cationic surfactants suitable in the practice of the present invention are described in: U.S. Pat. No. 4,576,648, col 3, line 57 to col 4, line 28; U.S. Pat. No. 5,374,672 col 7, line 43 to cot 8, line 36; U.S. Pat. No. 5,382,612 col 8, line 62 to col 9, line 53, incorporated by reference herein.

The random vinyl substituted aromatic/$C_4$–$C_6$ conjugated diolefin polymer/sulfur co-agglomerate is used at levels of 1–10%, preferably 2–5% in the asphalt. The final of sulfur level in the asphalt is 0.005–1.0%.

The Random Vinyl Substituted Aromatic/$C_4$–$C_6$ Conjugated Diolefin Polymer Suitable for Use in The Present Invention The random vinyl substituted aromatic/$C_4$–$C_6$ conjugated diolefin polymer suitable for use in the present invention comprises from about 65 to 100% by weight of a least one conjugated $C_4$–$C_6$ diolefin and from about 0%–35% by weight of a vinyl substituted aromatic. Styrene/butadiene rubber latex (SBR) is the preferred random vinyl substituted aromatic/$C_4$–$C_6$ conjugated diolefin polymer. Preferred stryenel butadiene rubber latex is available from BASF as BUTOFAN® NS 103.

The Asphalt Suitable for Use in The Present Invention

The asphalt suitable for use in the present invention is described in U.S. Pat. No. 5,672,642, column 1, lines 60–67 and column 2, lines 1–25, incorporated by reference herein.

The Sulfur Useful in the Practice of the Present Invention

Sulfur useful in the practice of the present invention is described in: U.S. Pat. No. 5,618,862 col 3, line 53 to 57; U.S. Pat. No. 5,382,612 col 5, line 54–59; U.S. Pat. No. 5,314,935 col 5, line 66 to col 6, line 2; U.S. Pat. No. 4,412,019 col 2, line 51–56; U.S. Pat. No. 4,242,246 col 2, line 65 to col 3 line 4, incorporated by reference herein.

Elemental sulfur as a dispersion is preferred. BOSTEX® 410 (68% elemental sulfur as a dispersion) available from Akron Dispersions is most preferred. The sulfur dispersion is blended with the random vinyl substituted aromatic/$C_4$–$C_6$ conjugated diolefin polymer at levels 0.5 to 10%, more preferably 1–6%, most preferably 1–3%. After blending with the random vinyl substituted aromatic/$C_4$–$C_6$ conjugated diolefin polymer the coagglomeration process begins.

Vulcanization Accelerators Useful in-the Practice of the Present Invention

Vulcanization accelerators are optional. However, if used, suitable vulcanization accelerators are disclosed in; U.S. Pat. No. 5,618,862, col 3, line 34–52 and col 3, line 58 to col 5, line 28; U.S. Pat. No. 5,684,091, col 1, line 61 to col 4, line 36; U.S. Pat. No. 5,382,612 col 5, line 32 to col 8, line 33; U.S. Pat. No. 5,314,935 col 5, line 47 to col 8, line 40 and incorporated by reference herein;

Further "THE VANDERBILT RUBBER HANDBOOK", published by R. T. Vanderbilt Company, Inc. Norwalk, Conn., Thirteenth Edition (1990), pages 12–16 contains a general description of sulfur vulcanization, and pages 296–330 describe suitable vulcanization accelerators.

Two preferred vulcanization accelerators are BOSTEX® 533B (50% active dispersion of 2-mercaptobenzothiazole) and Bostex® 224 (50% active dispersion of dipentylmethylene thiuramsulfide).

The following Examples are provided to illustrate the invention, but are not intended to limit the scope thereof. All parts are by weight unless otherwise indicated.

EXAMPLE 1

The base SBR latex used for this experiment was BUTOFAN® NS103 (25% styrene and 75% butadiene with potassium oleate added as a surfactant). It has the viscosity of approximately 500 mPas at 48% total solids. BOSTEX® 410 (68% sulfur as a dispersion from Akron Dispersion) was used as the sulfur dispersion. 3 kg of BUTOFAN® NS103 was placed in a plastic container and a desired amount of BOSTEX® 410 was dispersed to prepare the latex dispersion containing 1, 2, 3 and 6% active sulfur in the SBR latex polymer. These latex samples were, then, freeze agglomerated by placing them in a freezer at −20° C. for 24 hours. The frozen latex samples were defrosted at ambient temperature for 4 to 6 hours till they became latex again. The resulting latex samples had very low viscosity, of below 20 mPas, indicating they are successfully agglomerated. These latex samples were concentrated by vacuum distillation at 60° C. to increase the total solids between 55 to 65%. The viscosity of these concentrated sulfur coagglomerated latex samples were typically 200 to 300 mPas at 55% total solids.

These sulfur/SBR latex coagglomerates were then hot mixed with the CENEX® AC-20 asphalt. 291 g of the asphalt was heated to about 100° C. and the sulfur/SBR latex coagglomerate was added, under agitation, to form 3% SBR polymer in the polymer/asphalt admixture. After mixing in the SBR latex, the temperature was slowly raised to 160° C. under continuous agitation to evaporate the water, and kept agitated for an additional 2 hours to form a homogeneous latex polymer/asphalt admixture. BUTONAL® NS175 (e.g. styrene-butadiene rubber latex was used as a reference for the SBR latex without sulfur. Thus, five polymer modified asphalt samples, all containing 3% polymer in the asphalt, with 0, 1, 2, 3 and 6% sulfur in the SBR latex polymer, were prepared. A small portion (50 to 75 g) of the resultant samples was transferred to a 3 oz pen cup and placed in an oven at 160° C. for 24 hours. The samples were visually tested for compatibility. Table 1 summarizes results of the polymer/asphalt admixture storage stability test.

TABLE 1

Stability of the polymer/asphalt admixture during storage at 160° C.

| Storage Time | Sulfur Level in Coagglomerates, % | | | | |
|---|---|---|---|---|---|
| | 0 | 1 | 2 | 3 | 6 |
| 24 hours | No | Yes/No | Yes | Yes | Yes |
| 48 hours | | Yes/No | Yes | Yes | Yes |
| 72 hours | | Yes/No | Yes | Yes | Yes |

Yes—indicates storage stability Yes/No—indicates storage stable but difficult to process.

The sample with BUTONAL® NS175 (0% Sulfur) is indicated as "No" for the compatibility test result. This means that the sample showed a separated polymer rich layer at the asphalt surface. When this polymer rich layer was mixed-in with a wooden spatula, nearly all of the latex polymer adhered to it. This resulted in asphalt with almost no polymer.

The polymer rich layer separation was absent with polymer/asphalt admixture samples prepared with 2% or more sulfur co-agglomerated to the latex polymer. Further, no adhesion of the polymer was observed upon mixing with the spatula. In some cases, a small amount of skin formed at the surface, but it was easily mixed in with a spatula. Thus, these samples maintained a homogeneous polymer-asphalt admixture with or without a gentle mixing during the storage.

The polymer/asphalt admixture prepared with 1–6% sulfur in the SBR polymer became homogeneous, but very viscous gel-like structure during storage at 160° C. for 24 hours. Upon mixing the entire polymer/asphalt admixture adhered to the spatula (defined in Table 1 as "Yes/No").

The dynamic mechanical property of the SBR polymer-lasphalt admixture stored for 24 hours at 160° C. was tested with RHEOMETRIC® RDA 700 mechanical spectrometer using parallel plates of 2.5 cm in diameter. Approximately 3 g of the sample was placed between the plates and G' and G", storage and loss moduli, respectively were determined at 10

Hz at a temperature range between 25° and 85° C. Complex modulus, G* and phase angle, Λ, were calculated from G' and G" as a function of temperature. G*/sin(Λ) at 64° C., temperature at which G*/sin(Λ)=1 kPa, and tan(Λ) at 64° C. and 80° C. were determined graphically and listed in Table 2, and compared against these of Cenex® AC-20 asphalt without polymer. Since the polymer with 0% sulfur was not storage stable, the freshly prepared sample (without 24 hours storage at 160° C.) was used for the test.

TABLE 2

Dynamic Mechanical Properties of the Sulfur-Polymer Coagglomerates/Asphalt Admixture stored for 24 hours at 160° C. All Admixtures Contain 3% Polymer, Except the One Indicated as No Polymer.

| Dynamic Mechanical Properties | No Polymer | Sulfur Level in Coagglomerates, % | | | | |
|---|---|---|---|---|---|---|
| | | 0* | 1 | 2 | 3 | 6 |
| G*/sin(δ) at 64° C., kPa | 1.2 | 2.5 | 4.0 | 1.8 | 2.0 | 2.0 |
| Temperature at G*/sin(δ) = 1 kPa, ° C. | 66 | 72 | 82 | 71 | 72 | 72 |
| tan(δ) at 64° C. | 14 | 5.5 | 3.8 | 4.5 | 3.8 | 3.8 |
| tan(δ) at 80° C. | >40 | 6.0 | 3.5 | 6.0 | 5.0 | 5.0 |

*Freshly Prepared sample.

Results shown in Table 1 and 2 demonstrate that sulfur-polymer coagglomerate improves the storage stability of the polymer/asphalt admixture without sacrificing its mechanical properties. G' is the storage modulus, G" is the loss modulus, and G* is the complex modulus. We use G', G" to calculate G* and tan(δ), the phase angle. Based on these quantities, we calculate the value of G*/sin(δ). The higher this value, the asphalt or polymer modified asphalts are more viscous and elastic. According to the Strategic Highway Research Program (SHRP) definition, if G*/sin*(δ)>1 kPa, the asphalt or polymer modified asphalts are visco-elastic enough to withstand the stress created by load through traffic, so that the temperature at G*/sin(δ)=kPa is the highest temperature the pavement can withstand.

See, Donald W. Christensen, Jr. and David A. Anderson, "Interpretation of Dynamic Mechanical Test Data for Paving Grade Asphalt Cements", Asphalt Paving Technology, vol. 61, pp. 67–116 (1992), and SHRP-A-369 "Binder Characterization and Evaluation Volume 3: Physical Characterization", Strategic Highway Research Program (SHRP), National Research Council, Washington, D.C. 1994.

Conversely, in the absence of the sulfur/latex polymer coagglomeration step, the latex polymer/asphalt mixtures are unstable. For Example, BUTONAL® NS175 is the pressure agglomerated BUTOFAN® D NS103 with the total solids of 71% and the viscosity of about 2 mPas. A desired amount of the sulfur dispersion, (Bostex® 410), was merely blended into BUTONAL® NS175 to prepare the latex samples containing 1, 2, 3 and 6% in sulfur to the polymer. The polymer/asphalt admixtures using these latex samples were prepared and the storage stability was tested as described in Example 1. All these polymer/asphalt admixtures were storage unstable; each formed two distinct layers, the top being polymer rich and the bottom being asphalt rich. Majority of the polymer adhered to the spatula upon mixing. The sample with 6% sulfur blended admixture formed a hard skin on the surface. The skin could not be mixed-in by the spatula.

EXAMPLE 2

Cenex® AC-20 asphalt samples containing 2, 3, 4 and 6% SBR polymer were prepared using the 3% sulfur/latex coagglomerate sample discussed in Example 1. Even at 6% polymer loading condition, the viscosity of the polymer/asphalt admixture was low enough for mixing at temperature between 100 and 160° C. This was in contrast with the BUTONAL® NS175 (0% Sulfur); where the viscosity of the polymer/asphalt admixture becomes too high at 4% polymer loading, and the polymer rich phase climbed the shaft during the mixing. Thus, it was impossible to prepare the polymer/asphalt admixture containing above 4% BUTONAL® NS175 (0% sulfur).

The storage; stability of these polymer/asphalt admixtures prepared with 3% sulfur/latex coagglomerate were tested as in Example 1 and all of them were stable for 24, 48 and 72 hours storage at 160° C. The sulfur/latex coagglomerate reduces the viscosity of the polymer/asphalt admixture at high polymer loading, thus improving the processability of the admixture preparation.

The dynamic mechanical property of the polymer/asphalt admixture stored for 24 hours at 160° C. was tested using the procedure described in Example 1 and shown in Table 3. Sharp increase in the visco-elastic properties of the polymer/asphalt admixture can be seen at above 4% polymer in the admixture.

TABLE 3

Dynamic Mechanical Properties of the Sulfur-Polymer Coagglomerates/Asphalt Admixture

| Dynamic Mechanical Properties | SBR Polymer Level in polymer/Asphalt Admixture, % | | | |
|---|---|---|---|---|
| | 2 | 3 | 4 | 6 |
| G*/sin(δ) at 64° C., kPa | 2.0 | 2.0 | 4.0 | 7.0 |
| Temperature at G*/sin(δ) = 1 kPa, ° C. | 72 | 74 | 78 | 92 |
| tan(δ) at 64° C. | 4.8 | 3.8 | 2.8 | 2.8 |
| tan(δ) at 80° C. | 6.5 | 5.0 | 4.0 | 1.5 |

EXAMPLE 3

BUTOFAN® NS103 was pressure agglomerated with 2% sulfur in the latex polymer at 24 mP as to 27 mP as at 26 to 28° C. and concentrated to 70% solids. A pressure agglomerator from APV Gaulin® Homogenizer (Wilmington, Mass.) was used. The latex viscosity was 1.5 mPas at 70% total solids indicating successful co-agglomeration. This sulfur and latex polymer pressure coagglomerate was hot mixed into the Cenex AC-20 asphalt using the procedure described in Example 1. The polymer content of this polymer/asphalt admixture was again 3%. The polymer/asphalt admixture was storage stable at 160° C. for 24, 48 and 72 hours. Results of the dynamic mechanical measurement of the sample stored for 24 hours at 16020 C. are 3.0 kPa at 64° C., 76° C. at which G*/sin(δ)=1 kPa, and tan(δ)=4.5 and 4.8 at 64° C. and 80° C., respectively.

EXAMPLE 4

A sulfur/SBR latex coagglomerate containing vulcanization accelerator was also tested. BUTOFAN® NS103 was freeze agglomerated with 1, 2, 3 and 6% sulfur dispersion, (BOXTEX® 410), and between 0.025 and 0.25% of Box-tex® 224 or Bostex® 533B. (Bostex® 533B is 50% active aqueous dispersion of 2-mercaptobenzothiazole, and Bostex 224 is 50% active aqueous dispersion of dipentylmethylene thiuramrsulfide, from Akron Dispersion). As seen in Table 4, we can produce the sulfur/vulcanization accelerator/latex coagglomerate if the accelerator level is below a certain critical level in the latex polymer.

TABLE 4

Dispersion Stability of Sulfur/Vulcanization Accelerator/Latex Polymer Coagglomerates

| Vulcanization Accelerator | % to the Latex Polymer | Sulfur Level in Coagglomerated, % | | | |
|---|---|---|---|---|---|
| | | 1 | 2 | 3 | 6 |
| Bostex ® 224 | 0.025 | | Stable Latex | | |
| | 0.05 | | | | |
| | 0.1 | | Coagulated | | |
| | 0.15 | | | | |
| | 0.25 | | | | |
| Bostex ® 533B | 0.025 | | Stable Latex | | |
| | 0.05 | | | | |
| | 0.1 | | Coagulated | | |
| | 0.15 | | | | |
| | 0.25 | | | | |

These sulfur/vulcanization accelerator/latex coagglomerates were hot mixed with Cenex® AC-20 asphalt as in Example 1. Two samples which contain 0.025% and 0.05% Bostex® 533B to the latex polymer were tested. Both also contained 3% sulfur to the latex, and they were storage stable for 24, 48 and 72 hours at 160° C. The dynamic mechanical properties of these polymer/asphalt admixtures stored for 24 hours at 160° C. were tested as step in Example 1 and results are given in Table 5.

TABLE 5

Dynamic Mechanical Properties of the Sulfur-Polymer Coagglomerate/ Asphalt Admixture Containing the Vulcanization Accelerator

| | Bostex ® 533B Level in the coagglomerates, % | | |
|---|---|---|---|
| Dynamic Mechanical Properties | 0 | 0.025 | 0.05 |
| G*/sin(δ) at 64° C. kPa | 2.0 | 2.0 | 2.0 |
| Temperature at G*/sin(δ) = 1 kPa, ° C. | 72 | 72 | 72 |
| tan(δ) at 64° C. | 3.8 | 3.8 | 3.8 |
| tan(δ) at 80° C. | 5.0 | 5.0 | 5.0 |

EXAMPLE 5

Four latex samples were prepared BUTOFAN® NS 103 freeze coagglomerated with 6% sulfur dispersion, (BOSTEX® 410), (Latex A). The freeze agglomeration procedure described in Example 1 was used. Latex B is Latex A with 0.15% BOSTEX® 533B added to the latex polymer after agglomeration. Latex C is BUTONAL NS175 with post-addition of 6% sulfur and 0.15% Bostex ®533B to the polymer. Latex D is BUTONAL® NS175 with 0.15% BOSTEX® 224 to the polymer post-added. These latex samples were hot mixed with Cenex® AC-20 asphalt and storage stability was tested as in Example 1. Results are shown in Table 6.

TABLE 6

Storage Stability of Polymer/Asphalt Admixture at 160° C.

| Storage time | Latex A | Latex B | Latex C | Latex D |
|---|---|---|---|---|
| 24 hours | Yes | Yes | Yes | No |
| 48 hours | Yes | Yes | No | |
| 72 hours | Yes | Yes | | |

Post addition of 6% sulfur dispersion, (BOXTEX® 410), and 0.15% vulcanization accelerator (Bostex® 533B) to the latex polymer show some improvement on the storage stability, but only sulfur coagglomerated latex samples showed more than 24 hours storage stability. Results of the dynamic mechanical property of the polymer/asphalt admixture using Latex A and B were identical to these for 6% sulfur coagglomerate shown in Table 2.

EXAMPLE 6

The sulfur/latex coagglomerate can be used to prepare the cationic latex for the cationic asphalt emulsion application. Latex A and Latex B in Example 6 were concentrated to nearly 65% total solids by vacuum distillation. The cationic latices: Latex A-Cat and Latex B-Cat, were prepared using 4% Redicote E-11 (50% active cationic surfactant from Akzo Nobel) as the cationic surfactant and HCl. The latex samples were hot mixed with Cenex® AC-20 asphalt as in Example 1 to prepare the polymer/asphalt admixture containing 3% latex polymer. Physical properties of the polymer/asphalt admixtures were determined. BUTONAL® NX1118X (BASF Cationic Latex, which contains sulfur/vulcanization accelerator as post additives) was also used as a reference.

TABLE 7

Physical Properties of Polymer/Asphalt Admixture Prepared with Cationic Latex

| Properties | Control No Latex | BUTONAL ® NX118X | Latex A-Cat | Latex B-Cat |
|---|---|---|---|---|
| Elastic Recover at 4° C., % | 8 | 36 | 45 | 44 |
| Force Ductility | | | | |
| Area Under Curve, N-m | 7 | 65 | 40 | 43 |
| Elongation at Break, cm | 21 | 58 | 38 | 35 |
| Softening Point, ° C. | 51 | 59 | 59 | 59 |

Elastic recovery and force ductility were determined using the mold specified in American Society of Testing and Measurements (ASTM) D113, and the softening point based on ASTM D36.

EXAMPLE 7

Eight asphalt samples from the Materials Reference Library (MRL) were used for the storage stability of the sulfur/latex coagglomerate. These asphalt samples are AAA-1, AAB-1, AAC-1, AAD-1, AAF-1, AAG-1 AAK-1 and AAM-1 and often referred as the Strategic Highway Research Program (SHRP) core asphalts. BUTONAL® NS175 and several samples of the sulfur/latex coagglomerates were hot mixed with these MRL asphalts using the procedure described in Example 1. All resulted polymer/asphalt admixtures contain 3% polymer and the storage stability of these admixtures were examined as in Example 1 and Table 8 summarizes the results.

See, Donald W. Christensen, Jr. and David A. Anderson, "Interpretation of Dynamic Mechanical Test Data for Paving Grade Asphalt Cements", Asphalt Paving Technology, vol. 61, pp. 67–116 (1992), and SHRP-A-369 "Binder Characterization and Evaluation Volume 3: Physical Characterization", Strategic Highway Research Program, National Research Council, Washington, D.C. 1994.

The Table 8 demonstrates advantage in the storage stability using sulfur/latex coagglomerates. With AAA-1, AAB-1, AAD-1 and AAK-1 asphalts, only sulfur/latex coagglomerates (either pressure or freeze coagglomeration) are storage stable for above 24 hours at 160° C. All polymer/asphalt admixtures were storage stable with AAC-1, AAF-1, AAG-1 and AAM-1 with or without (BUTONAL® NS175) sulfur coagglomeration. The sulfur/polymer coagglomerates do not alter the storage stability of the polymer asphalt admixtures with AAC-1, AAF-1, AAG-1 and AAM-1.

TABLE 8

Storage Stability of Polymer/Asphalt Admixture with 8 MRL Asphalt at 160° C.

| MRL Asphalts | Sulfur/Latex Coagglomerates | Storage Time, hours | | |
|---|---|---|---|---|
| | | 24 | 48 | 72 |
| AAA-1 | BUTONAL ® NS175 | No | | |
| | 2% S Freeze Coaggl. | Yes | Yes | Yes |
| AAB-1 | BUTONAL ® NS175 | No | | |
| | 1% S Freeze Coaggl. | Yes/No*1 | Yes/No*1 | Yes/No*1 |
| | 2% S Freeze Coaggl. | Yes | Yes | Yes |
| | 3% S Freeze Coaggl. | Yes | Yes | Yes |
| AAD-1 | BUTONAL ® NS175 | No | | |
| | 2% S Pressure Coaggl. | Yes*2 | No*3 | |
| | 6% S Freeze Coaggl. | Yes | Yes | Yes |
| AAK-1 | BUTONAL ® NS175 | No | | |
| | 2% S Pressure Coaggl. | No*3 | | |
| | 2% S Freeze Coaggl. | Yes | Yes | Yes |
| AAC-1 | BUTONAL ® NS175 | Yes | Yes | Yes |
| | 2% S Pressure Coaggl | Yes | Yes | Yes |
| AAF-1 | BUTONAL ® NS175 | Yes | Yes | Yes |
| | 2% S Freeze Coaggl. | Yes | Yes | Yes |
| AAG-1 | BUTONAL ® NS175 | Yes | Yes | Yes |
| | 1% S Freeze Coaggl. | Yes | Yes | Yes |
| | 2% S Freeze Coaggl. | Yes | Yes | Yes |
| | 3% S Freeze Coaggl | Yes | Yes | Yes |
| | 6% S Freeze Coaggl. | Yes | Yes | Yes |
| AAM-1 | BUTONAL ® NS175 | Yes | Yes | Yes |
| | 2% S Freeze Coaggl. | Yes | Yes | Yes |
| | 3% S Freeze Coaggl. | Yes | Yes | Yes |

*1As defined in Example 1.
*2Presence of very thin skin of less than 1 mm on the asphalt surface, which was redispersed upon mixing.
*3Same as *2, but the skin was hard and could not be redispersed upon mixing.

The dynamic mechanical property of the polymer/asphalt admixture stored for 24 hours at 160° C. was tested and results are shown in Table 9. The sulfur/latex coagglomerates provide equal or better improvement on the viscoelastic properties of the polymer/asphalt admixtures than the one with freshly prepared sample of the admixture with BUTONAL® NS175. Thus, we can conclude that the sulfur/latex coagglomerate improves the storage stability of the polymer/asphalt admixture without reducing the viscoelastic properties.

TABLE 9

Dynamic Mechanical Properties of the Sulfur-Polymer Coagglomerates/Asphalt Admixture stored for 24 hours at 160° C. All Admixtures Contain 3% Polymer, Except the One Indicated as No Polymer.

AAA-1 MRL Asphalt

| Dynamic Mechanical Properties | No Polymer | Butonal NS175* | 2% S Freeze Coaggl. |
|---|---|---|---|
| G*/sin(δ) at 64° C., kPa | 0.8 | 1.8 | 2.3 |
| Temperature at G*/sin(δ) = 1 kPa, ° C. | 62 | 69 | 72 |
| tan(δ) at 64 ° C. | 23 | 5.0 | 3.0 |
| tan(δ) at 80 ° C. | >40 | 7.0 | 4.0 |

*Freshly prepared sample

AAB-1 MRL Asphalt

| Dynamic Mechanical Properties | No Polymer | BUTONAL ® NS175* | Sulfur Level in Coagglomerates, % | | |
|---|---|---|---|---|---|
| | | | 1 | 2 | 3 |
| G*/sin(Λ) at 64° C., kPa | 0.6 | 2.5 | 2.5 | 2.0 | 2.0 |
| Temperature at G*/sin(Λ) = 1 kPa, ° C. | 59 | 72 | 74 | 72 | 72 |
| tan(Λ) at 64° C. | 30 | 4.5 | 3.8 | 3 8 | 3.8 |
| tan(Λ) at 80° C. | >50 | 7.0 | 4.4 | 4.5 | 4.5 |

*Freshly prepared sample

AAC-1 MRL Asphalt

| Dynamic Mechanical Properties | No Polymer | Butonal ® NS175* | 2% S Pressure Aggl. |
|---|---|---|---|
| G*/sin(δ) at 64° C., kPa | 0.9 | 0.9 | 0.8 |
| Temperature at G*/sin(δ) = 1 kPa, ° C. | 63 | 63 | 61 |
| tan(δ) at 64° C. | 24 | 6.5 | 4.8 |
| tan(δ) at 80° C. | >40 | 8.0 | 4.8 |

*Freshly prepared sample

AAF-1 MRL Asphalt

| Dynamic Mechanical Properties | No Polymer | Butonal ® NS175* | 2% S Freeze Coaggl. |
|---|---|---|---|
| G*/sin(δ) at 64° C., kPa | 1.5 | 2.1 | 2.2 |
| Temperature at G*/sin(δ) = 1 kPa, ° C. | 67 | 72 | 72 |
| tan(δ) at 68° C. | 26 | 6.0 | 4.5 |
| tan(δ) at 80° C. | >40 | 6.0 | 4.0 |

*Freshly prepared sample

AAG-1 MRL Asphalt

| Dynamic Mechanical Properties | No Polymer | Butonal NS175* | Sulfur Level in Coagglomerates, % | | | |
|---|---|---|---|---|---|---|
| | | | 1 | 2 | 3 | 6 |
| G*/sin(δ) at 64° C., kPa | 0.8 | 1.8 | 1.8 | 1.8 | 2.0 | 1.8 |
| Temperature at G*/sin(δ) = 1 kPa, ° C. | 62 | 68 | 68 | 68 | 72 | 68 |
| tan(δ) at 64° C. | >100 | 5.0 | 5.0 | 5.0 | 5.0 | 5.0 |
| tan(δ) at 80° C. | >100 | 5.0 | 5.0 | 5.0 | 5.0 | 5.0 |

*Freshly prepared sample

AAK-1 MRL Asphalt

| Dynamic Mechanical Properties | No Polymer | Butonal NS175* | 2% S Freeze Coaggl. |
|---|---|---|---|
| G*/sin(δ) at 64° C., kPa | 2.5 | 4.5 | 3.5 |
| Temperature at G*/sin(δ) = 1 kPa, ° C. | 72 | 80 | 78 |
| tan(δ) at 64° C. | 7 | 4.0 | 3.0 |
| tan(δ) at 80° C. | 15 | 6.0 | 5.0 |

*Freshly prepared sample

| AAM-1 MRL Asphalt | | | | | |
|---|---|---|---|---|---|
| Dynamic Mechanical Properties | No Polymer | Butonal NS175* | Sulfur Level in Coagglomerates, % | | |
| | | | 1 | 2 | 3 |
| G*/sin(δ) at 64° C., kPa | 1.2 | 1.5 | 2.2 | 1.5 | 1.5 |
| Temperature at G*/sin(δ) = 1 kPa, ° C. | 65 | 66 | 72 | 66 | 66 |
| tan(δ) at 64° C. | 15 | 11 | 9.0 | 11 | 60 |
| tan(δ) at 80° C. | >40 | 19 | 10 | 20 | 10 |

*Freshly prepared sample

EXAMPLE 8

A low temperature polymerized polybutadiene latex was prepared using a recipe similar to that for preparing GR-S (Government Rubber—Styrene) 1500, but without the styrene. See, R. W. Brown, C. V. Bawn, E. B. Hansen and L. H. Howland, Sodium Formaldehyde Sulfoxilate in GR-S Polymerization, Ind. Eng. Chem. 46, 1073–1080 (1954). Potassium Oleate was used as a soap instead of DRESINATE® 214 (CAS # 61790-50-9, potassium salt of a rosin acid, available from Hercules, Inc., Wilmington, Del.) in the GR-S 1500 recipe. After removing unreacted monomer under vacuum, the latex was freeze co-agglomerated with 3.0 wt % sulfur to the polymer.

TABLE 10

Storage Stability of the polymer/asphalt admixtures during storage at 160° C.

| Storage Time | PolyBd | PolyBd-S |
|---|---|---|
| 24 hours | No | Yes |
| 48 hours | | Yes |
| 72 hours | | Yes |

The polymer/asphalt admixture containing 3.0 wt % latex polymer in the asphalt was prepared and the storage stability was tested as described in Example 1. Ergon® AC-20 asphalt (Ergon Corp., Jackson, Miss.) was used. Two types of admixtures, Polybutadiene and polybutadiene/styrene were prepared. PolyBd is the polybutadiene latex and PolyBD-S is the sulfur/polybutadiene latex coagglomerate containing 3 wt % sulfur added to the polymer. The sulfur/polybutadiene coagglomerate was prepared using the same procedure described in Example 1 for the sulfur/SBR latex coagglomerates. The PolyBd admixture is not storage stable and a polymer rich layer formed on the surface within 24 hours of storage. See Table 10. In-contrast, the other admixture, PolyBd-S, is storage stable.

The dynamic mechanical property of the polymer/asphalt admixture was tested and results are shown in Table 11. Again, the sulfur/latex coagglomerate provides equal or better visco-elastic properties of the Polymer/asphalt admixture than the one with freshly prepared sample of the admixture with the same polymer without sulfur co-agglomeration. Thus, we conclude that this sulfur coagglomeration can also be applied to the polybutadiene latex to improve its compatibility to the asphalt.

TABLE 11

Dynamic mechanical properties of the sulfur-polymer coagglomerate/asphalt admixtures containing 3 wt % polymer.

| Ergon AC-20 Asphalt | No | PolyBd-S | | | |
|---|---|---|---|---|---|
| Dynamic Mechanical Properties | Polymer Fresh | PolyBd Fresh | Fresh | 24 hours* | 48 hours* |
| G*/sin(δ) at 64° C., kPa | 1.3 | 4.3 | 3.3 | 4.0 | 4.0 |
| Temperature at G*/sin(δ) = 1 kPa, ° C. | 65 | 78 | 76 | 78 | 79 |
| tan(δ) at 64° C. | 30 | 4.3 | 4.0 | 3.0 | 2.5 |
| tan(δ) at 80° C. | >40 | 6.0 | 5.0 | 3.0 | 2.5 |

*Stored for 24 and 48 hours at 160° C.

We claim:

1. A process for improving the homogeneity of $C_4$–$C_6$ conjugated diolefin latex polymer/asphalt admixtures comprising the steps of:

(a) blending said conjugated diolefin latex polymer and an aqueous dispersion of sulfur;

(b) agglomerating the blended $C_4$–$C_6$ conjugated diolefin latex polymer and sulfur formed in step (a) to form a coagglomerate in latex form;

(c) mixing said coagglomerate formed in step (b) with the asphalt at temperature between 100° C. and 160° C.

2. A process according to claim 1 wherein the $C_4$–$C_6$ conjugated latex polymer is butadiene rubber latex.

3. A process for improving the homogeneity of $C_4$–$C_6$ conjugated diolefin latex polymer/asphalt admixtures comprising the steps of:

(a) blending butadiene latex polymer and 2 to 3% of an aqueous dispersion of sulfur;

(b) agglomerating the blended butadiene latex polymer and sulfur formed in step (a) to form a coagglomerate in latex form;

(c) mixing said coagglomerate formed in step (b) with the asphalt at temperature between 100° C. and 160° C.

4. The process of claim 3 wherein the final level of sulfur in the asphalt is 0.005–1.0%.

* * * * *

UNITED STATES PATENT AND TRADEMARK OFFICE
CERTIFICATE OF CORRECTION

PATENT NO.     : 6,348,525 B1                                    Page 1 of 1
DATED          : February 19, 2002
INVENTOR(S)    : Koichi Takamura et al.

It is certified that error appears in the above-identified patent and that said Letters Patent is hereby corrected as shown below:

Title page,
Item [63], after "application No. 09/", and before "filed on ", please delete "653,553 ", and insert -- 063,553 --; after "Pat. No.", please delete "6,024,476 ", and insert -- 6,300,392 --;

Column 1,
Lines 10-11, after "Pat. No.", please delete "6,024,476 ", and insert -- 6,300,392 --.

Signed and Sealed this

Third Day of December, 2002

JAMES E. ROGAN
*Director of the United States Patent and Trademark Office*